(12) United States Patent
Yun

(10) Patent No.: US 8,570,387 B2
(45) Date of Patent: Oct. 29, 2013

(54) APPARATUS FOR PROCESSING DIGITAL IMAGE AND METHOD OF CONTROLLING THE SAME

(75) Inventor: Jae-mu Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 855 days.

(21) Appl. No.: 12/381,916

(22) Filed: Mar. 18, 2009

(65) Prior Publication Data

US 2009/0295978 A1    Dec. 3, 2009

(30) Foreign Application Priority Data

May 29, 2008   (KR) ........................ 10-2008-0050452

(51) Int. Cl.
*H04N 5/228* (2006.01)
*G03B 17/00* (2006.01)

(52) U.S. Cl.
USPC ...................................... 348/208.99; 396/52

(58) Field of Classification Search
USPC ........ 348/208.99, 208.2, 208.4, 208.7, 208.8, 348/208.11; 396/52–55
See application file for complete search history.

(56) References Cited

U.S. PATENT DOCUMENTS

| 6,263,162 | B1 * | 7/2001 | Yamazaki et al. | 396/55 |
| 7,652,712 | B2 * | 1/2010 | Watanabe et al. | 348/340 |
| 8,045,009 | B2 * | 10/2011 | Stavely et al. | 348/208.16 |
| 2005/0200712 | A1 * | 9/2005 | Uenaka | 348/208.99 |
| 2008/0152332 | A1 * | 6/2008 | Koo et al. | 396/55 |

FOREIGN PATENT DOCUMENTS

| KR | 10-2007-0036655 A | 4/2007 |
| KR | 10-2007-0070145 A | 7/2007 |
| KR | 10-2007-0102431 A | 10/2007 |
| WO | WO 98/58323 A2 | 12/1998 |
| WO | WO 2007/050171 A1 | 5/2007 |

* cited by examiner

*Primary Examiner* — Aung S Moe
*Assistant Examiner* — Mekonnen Dagnew
(74) *Attorney, Agent, or Firm* — Drinker Biddle & Reath LLP

(57) ABSTRACT

An apparatus for processing a digital image capable of recognizing user input by motion of a user through a voice coil motor (VCM) is provided. Also, a method of controlling the apparatus is provided. The apparatus for processing a digital image includes: a body; a VCM installed to the body generating motion signals according to motion of the body; an operation recognition interface processing the motion signals and generating motion data of a digital signal; and a controller recognizing motion of the body from the motion data and recognizing user input according to the motion.

17 Claims, 12 Drawing Sheets

APPARATUS FOR PROCESSING DIGITAL IMAGE AND METHOD OF CONTROLLING THE SAME

CROSS-REFERENCE TO RELATED PATENT APPLICATION

This application claims the benefit of Korean Patent Application No. 10-2008-0050452, filed on May 29, 2008 in the Korean Intellectual Property Office, the entire contents of which is incorporated herein by reference.

BACKGROUND OF THE INVENTION

1. Field of the Invention

The present invention relates to an apparatus for processing a digital image and a method of controlling the apparatus. More particularly, the present invention relates to an apparatus for processing a digital image capable of sensing motion of a user and recognizing input by a user from the sensed motion, and a method of controlling the apparatus.

2. Description of the Related Art

In general, an apparatus for processing a digital image includes all devices which process images of a digital camera, a personal digital assistant (PDA), a phone camera, and a personal computer (PC) camera and the like and which utilize an image recognition sensor.

The apparatus for processing a digital image processes an image received through an imaging device and compresses the processed image to generate an image file in a digital signal processor. Accordingly, the image file is thereby stored in a memory.

Moreover, the apparatus for processing a digital image can display an image of an image file, that is received from an imaging device or that is stored in a storage medium, on a display device such as a liquid crystal display (LCD).

Meanwhile, the apparatus for processing a digital image includes various input means and recognizes input requests of a user through each of the input means. Such input means may include buttons for sensing a user's pressing action on the button, a menu system displayed on a display device, and a touch panel displayed on a screen for sensing a user's pressing action on the touch panel, for example.

SUMMARY OF THE INVENTION

The present invention provides an apparatus for processing a digital image and a method of controlling the apparatus. This apparatus is capable of recognizing user input by a user's motion utilizing a voice coil motor (VCM).

According to an embodiment of the present invention, an apparatus for processing a digital image is provided. The apparatus includes: a body; a voice coil motor (VCM) installed to the body generating motion signals according to motion of the body; an operation recognition interface processing the motion signals and generating motion data of a digital signal; and a controller recognizing motion of the body from the motion data and recognizing user input according to the motion.

The VCM may include a hole sensor generating the motion signals as an output voltage according to the motion of the body.

The operation recognition interface may include an amplifier and a signal converter, the amplifier amplifying the output voltage and generating an amplified voltage and the signal converter converting the amplified voltage of an analog signal into the motion data of a digital signal.

The operation recognition interface may further include a gain controller and an offset controller, the gain controller controlling the range of amplification of the motion signals to be within a set reference range and the offset controller controlling offset of the motion signals.

The output voltage may include a first voltage and a second voltage forming a potential difference according to the motion of the body with respect to constant current flowing in the hole sensor.

The amplifier may include a differential amplifier and an inverting amplifier, the differential amplifier amplifying the difference between the first voltage and the second voltage and generating the differential amplified voltage and the inverting amplifier removing high-frequency noise from the differential amplified voltage and reversing a phase, thereby amplifying.

The VCM may include an operation unit and a recognition unit, the operation unit moving in a direction opposite to the motion of the body with respect to the body and the recognition unit installed to be fixed to the body recognizing the motion of the operation unit.

The operation unit may include: a lens holder included in a case, fixing a lens group including at least one lens to a center portion of the operation unit, and being accelerated in a direction opposite to the motion of the body; an operating magnet operating the lens holder, which is fixed to the lens holder; a hole sensor sensing magnet sensing the motion of the lens holder, which is fixed to the lens holder; and an elastic body allowing the lens holder to be elastically supported to the case.

The recognition unit may include a voice coil and the hole sensor, the voice coil installed to correspond to the operating magnet operating the operating magnet and the hole sensor recognizing the motion of the hole sensor sensing magnet.

The VCM may further include at least one bearing disposed between the operation unit and the recognition unit guiding the operation unit to two-dimensionally move with respect to the recognition unit.

The motion signals may be generated when the power is not supplied to the voice coil.

The apparatus may further include a vibration sensor sensing vibration of the body; and a vibration signal converter processing an output signal of the vibration sensor and converting the processed output signal into a vibration signal which can be processed in the controller.

The controller may receive the vibration signal and generates a voice coil operation signal operating the VCM which moves the lens for compensating the vibration of the body.

The apparatus may further include a voice coil operation unit receiving the voice coil operation signal and operating the voice coil included in the VCM.

According to another embodiment of the present invention, a method of controlling an apparatus for processing a digital image is provided. The method includes: (a) blocking a power supplied to a voice coil included in a voice coil motor (VCM) installed to a body; (b) sensing motion signals generated by the motion of the body in the VCM; (c) recognizing motion by the motion of the body from the motion signals; and (d) recognizing user input from the motion.

The method may further include determining whether a current mode for operating the apparatus for processing a digital image is a photographing mode for photographing an image, wherein when it is determined that the current mode is not the photographing mode, the power supplied to the voice coil is blocked as in (a). In addition, (c) may include generating motion data of a digital signal by processing the motion signals and recognizing the motion from the motion data.

Also, (d) may further include recognizing motion pattern of the motion data, recognizing user input corresponding to each motion pattern, and performing operations corresponding to the user input.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown.

Figure 1:
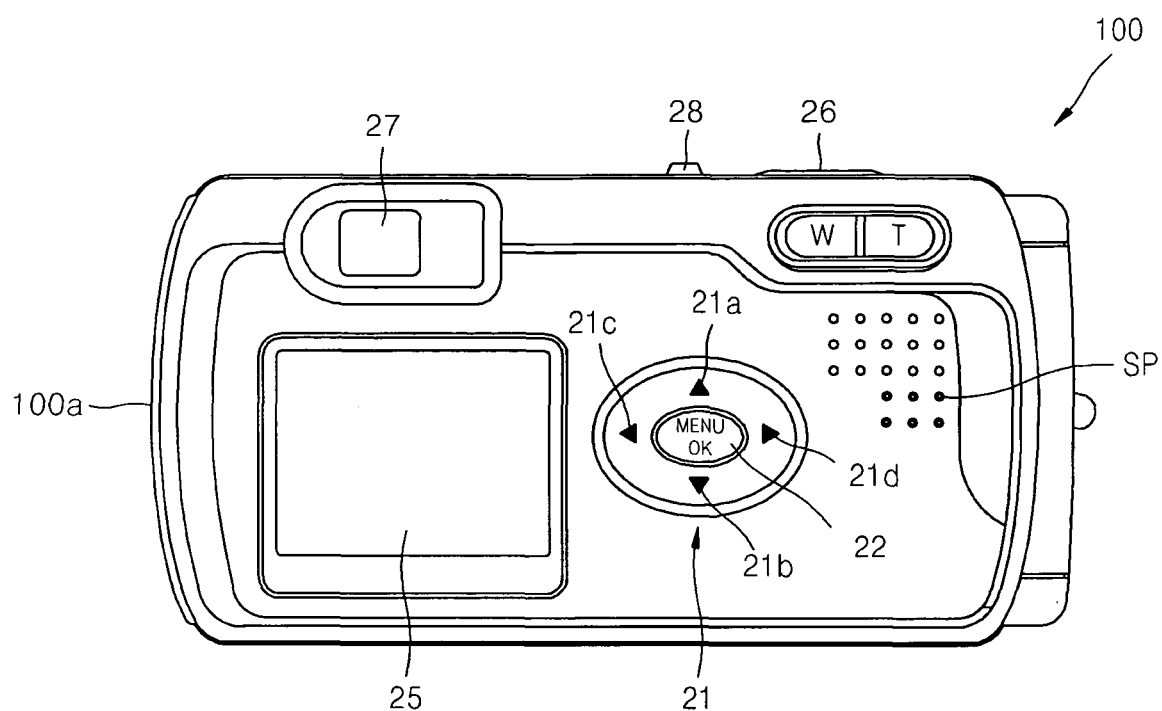
FIG. 1 illustrates an example of an outer rear part of a digital camera as an example of an apparatus for processing a digital image according to an embodiment of the present invention.

FIG. 1 illustrates an example of an outer rear part of a digital camera 100 as an example of an apparatus for processing a digital image according to an embodiment of the present invention.

Referring to the example of FIG. 1, the rear part of the digital camera 100 may include a direction button 21, a menu-ok button 22, a wide-angle zoom button W, a telephoto-zoom button T, and a display panel 25.

The direction button 21 may include four buttons including an upward button 21a, a downward button 21b, a left button 21c, and a right button 21d. The direction button 21 and the menu-ok button 22 are input keys for executing various menus relating to operation of the apparatus for processing a digital image such as a digital camera.

The wide-angle zoom button W and the telephoto-zoom button T respectively widens and narrows a view angle according to input thereof. In particular, these buttons are used to change the size of a selected exposure region. The display panel 25 may be an image display device such as a liquid crystal display (LCD).

The display panel 25 may be included in a display unit (as shown in a display unit 580 of FIG. 5) on which an image input by being photographed from outside or input from a stored image file is displayed.

Meanwhile, the front part or upper part of the digital camera 100 may include a shutter release button 26, a flash (not shown), a power switch 28, and a lens unit (not shown). In addition, the front part and the rear part of the digital camera 100 may include an object lens and an ocular lens of a view finder 27.

The direction button 21, menu-ok button 22, shutter release button 26, and power switch 28 may be included in a user operating unit (as shown, for example, in a user operating unit 590 of FIG. 5) through which a user inputs items to be operated from outside.

The shutter release button 26 is opened and closed for an imaging device such as a charge coupled device (CCD) or a film to be exposed to light for a predetermined time. In addition, the shutter release button 26 is connected to an aperture (not shown) and appropriately exposes the subject of an image, thereby recording the image to the imaging device.

Figure 2:
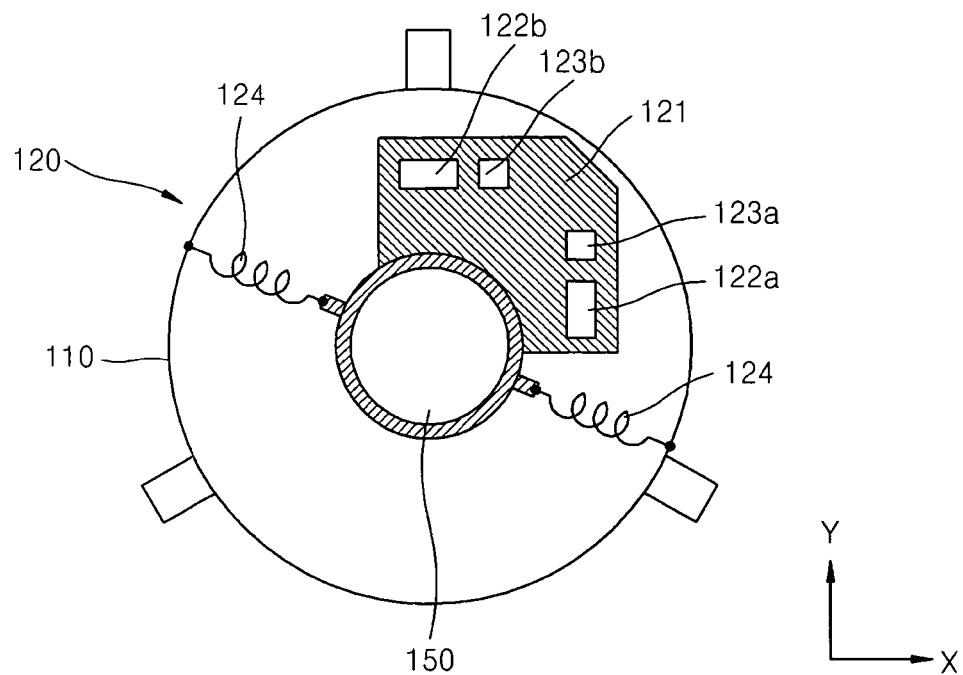
FIGS. 2 and 3 schematically illustrate examples of a voice coil motor (VCM) capable of being mounted on an apparatus for processing a digital image.
Figure 3:
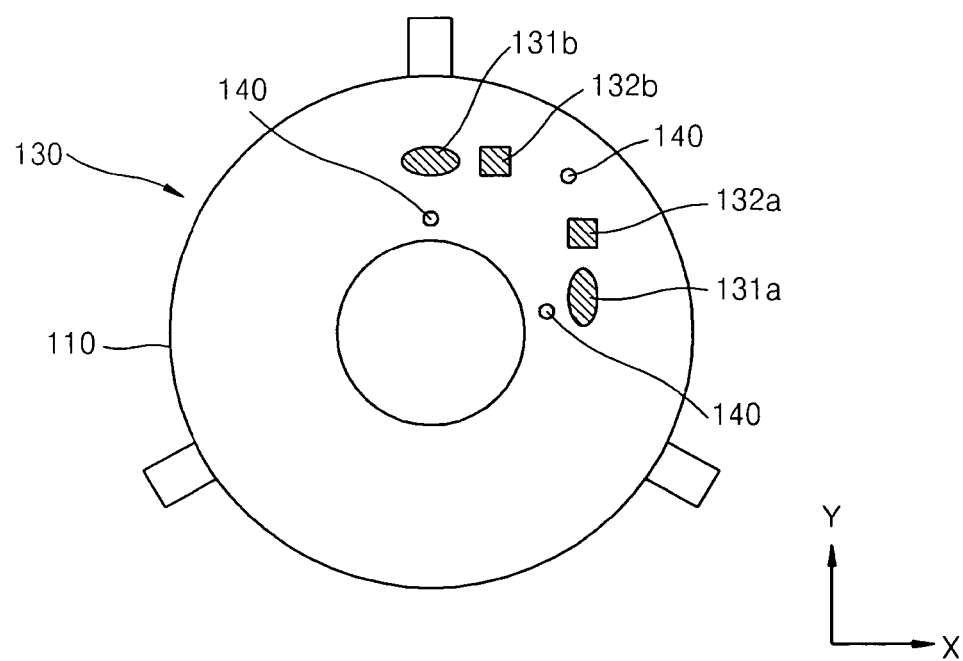

The digital camera 100 which is an example of an apparatus for processing a digital image may include a voice coil motor (VCM) as illustrated in FIGS. 2 and 3. FIGS. 2 and 3 schematically illustrate examples of a voice coil motor (VCM) capable of being mounted on an apparatus for processing a digital image.

A VCM senses vibration of a body 100a of the digital camera 100 and moves lenses or the imaging device according to the vibration so that the VCM may be an image stabilizer which mechanically corrects the image being shaken by user vibration and thereby results in a high quality image being obtained.

Accordingly, in order for VCM to correct the image being vibrated by a user and to move an image adjusting lens group, VCM may be installed in the body 100a surrounding the image adjusting lens group.

Meanwhile, the apparatus for processing a digital image such as the digital camera 100 senses motion of a user who moves the body 100a up and down, left and right, or rotates the body 100a and recognizes user motion input with respect to various patterned motions.

Here, according to pre-set functionality with respect to each user motion input, the apparatus for processing a digital image may perform functions of skipping images forward or backward and deleting images in a reproduction mode. In this case, the user motion can be input by the VCM as illustrated in FIGS. 2 and 3.

As an example of the apparatus for processing a digital image to which the present invention can be applied, a digital camera, an apparatus for controlling the digital camera, and a method of controlling the digital camera are disclosed in U.S. Patent Application Publication No. 2004/0130650, entitled Method of automatically focusing a quadratic function in camera, the entire contents of which is incorporated herein by reference. For example, the entire contents of the disclosure associated with the digital camera, the apparatus for controlling the digital camera, and the method of controlling the digital camera as disclosed in U.S. Patent Application Publication No. 2004/0130650 are hereby incorporated by reference so as to be included in the present specification and thus a detailed description of such features is not repeated here.

FIGS. 2 and 3 schematically illustrate examples of a VCM capable of being mounted on the apparatus for processing a digital image.

Referring to the examples of FIGS. 2 and 3, a VCM may be used as an actuator by input from outside or a sensor sensing motion of the apparatus for processing a digital image to which the VCM is installed. Accordingly, a VCM is installed to the body of the apparatus for processing a digital image and generate motion signals according to motion of the body.

A VCM includes an operation unit 120 and a recognition unit 130 and may be operated as an acceleration sensor recognizing motion of the operation unit 120 by the recognition unit 130.

The operation unit 120 may move against the body in a direction opposite to motion of the body. The recognition unit 130 is installed to be fixed to the body and senses motion of the operation unit 120.

The operation unit 120 and the recognition unit 130 may be installed within a case 110 so as for the operation unit 120 to relatively move with respect to the recognition unit 130. Here, the operation unit 120 may two-dimensionally move with respect to the recognition unit 130 on a plane formed between the operation unit 120 and the recognition unit 130.

In order to do so, a VCM may include at least one bearing 140 interposed between the operation unit 120 and the recognition unit 130. Here, as illustrated in FIG. 3, three bearings 140 may be included so as to guide the operation unit 120 to two-dimensionally move with respect to the recognition unit 130.

Thus, the operation unit 120 can move with respect to the recognition unit 130 without generating tilting.

The operation unit 120 may move against the recognition unit 130 in a direction opposite to motion of the body. Thus, the operation unit 120 may be installed to move against the body by being elastically supported by the body.

The operation unit 120 may include a lens holder 121, first and second operating magnets 122a and 122b, first and second hole sensor sensing magnets 123a and 123b, and an elastic body 124.

The lens holder 121 may be included in the case 110 and may be accelerated in a direction opposite to motion of the body. Also, the lens holder 121 may fix a lens group 150 including at least one lens to a center portion of the operation unit 120.

Accordingly, the lens holder 121 is moved in a direction of X or Y due to operation of voice coils 131a and 131b and thereby, the position of the lens group 150 may be adjusted.

In other words, vibration of the body is sensed by a vibration signal sensing unit that is separately included and the lens group 150 can be moved to where the vibration can be compensated. Accordingly, the vibration of the apparatus for processing a digital image can be mechanically compensated and thus an image having an improved quality can be obtained.

The operating magnets 122a and 122b are fixed to the lens holder 121 and may operate the lens holder 121. That is, the operating magnets 122a and 122b are moved along with the lens holder 121 which fixes the operating magnets 122a and 122b thereto by the power source supplied to the voice coils 131a and 131b and thereby the lens group 150 fixed to the lens holder 121 is moved.

The operating magnets 122a and 122b may be the first operating magnet 122a and a second operating magnet 122b which are operated in each different direction. The voice coils 131a and 131b may be the first voice coil 131a and the second voice coil 131b. The first operating magnet 122a can be moved to the X-direction by the first voice coil 131a. The second operating magnet 122b may be moved to the Y-direction by the second voice coil 131b.

Accordingly, the first operating magnet 122a and the second operating magnet 122b may be respectively operated in the X-direction and the Y-direction and may be moved in a two-dimensional plane by combining motion in the X-direction and motion in the Y-direction.

The hole sensor sensing magnets 123a and 123b may be fixed to the lens holder 121 and sense motion of the lens holder 121.

The hole sensor sensing magnets 123a and 123b are moved along with the lens holder 121 due to motion of the lens holder 121 and thus, hole sensors 132a and 132b sense motion of the first and second hole sensor sensing magnets 123a and 123b, thereby recognizing motion of the lens holder 121.

That is, since the hole sensors 132a and 132b sense motion of the hole sensor sensing magnets 123a and 123b, the position of the lens group 150 may be sensed more accurately. Thus, when VCMs 120 and 130 are used as an image stabilizer, the position of the lens group 150 is sensed by the hole sensor sensing magnets 123a and 123b and may be feedback controlled for the lens group 150 to be placed to the position that is set.

Meanwhile, when the lens holder 121 can be freely moved as power supplied to the first and second voice coils 131a and 131b is turned off, the lens holder 121 may be accelerated against the motion of the body in a direction opposite to the body being accelerated. Accordingly, since motion of the hole sensor sensing magnets 123a and 123b is sensed by the hole sensors 132a and 132b, motion of the body can be recognized.

The hole sensor sensing magnets 123a and 123b may be the first hole sensor sensing magnet 123a and the second hole sensor sensing magnet 123b which are moved in each different direction. The first hole sensor sensing magnet 123a may move to the X-direction along with the lens holder 121. The second hole sensor sensing magnet 123b may move to the Y-direction along with the lens holder 121.

The elastic body 124 allows the lens holder 121 to be elastically supported to the case 110. Here, the elastic body 124 may be disposed diagonally against the case 110 in order to prevent the lens holder 121 being rotated or polarized to a specific direction. Accordingly, the lens group 150 may be placed to a center portion of the operation unit 120.

The recognition unit 130 is designed to be fixed to the body and senses motion of the operation unit 120. Accordingly, the recognition unit 130 may include the first and second voice coils 131a and 131b and the hole sensors 132a and 132b.

The first and second voice coils 131a and 131b are installed to correspond to the first and second operating magnets 122a and 122b and thereby operate the first and second operating magnets 122a and 122b.

The first voice coil 131a corresponds to the first operating magnet 122a and the second voice coil 131b corresponds to the second operating magnet 122b. That is, the first voice coil 131a moves the first operating magnet 122a to the X-direction and the second voice coil 131b moves the second operating magnet 122b to the Y-direction.

In this regard, when power supplied to the first and second voice coils 131a and 131b, continuous force may be applied to the lens holder 121.

In addition, when power is not supplied to the first and second voice coils 131a and 131b, the lens holder 121 can freely move against the case 110. In this case, motion of the body is delivered to the lens holder 121 and the lens holder 121 may be accelerated in a direction opposite to motion of the body.

In this regard, motion of the lens holder 121 is sensed by the hole sensors 132a and 132b and motion signals can be generated in the hole sensors 132a and 132b. That is, when power is not supplied to the first and second voice coils 131a and 131b, the motion signals are generated in the hole sensors 132a and 132b.

The hole sensors 132a and 132b are installed to correspond to the first and second hole sensor sensing magnets 123a and 123b and sense motion of the first and second hole sensor sensing magnets 123a and 123b, thereby generating the motion signals. The hole sensors 132a and 132b may be the first hole sensor 132a and the second hole sensor 132b.

The first hole sensor 132a corresponds to the first hole sensor sensing magnet 123a and the second hole sensor 132b corresponds to the second hole sensor sensing magnet 123b. That is, the first hole sensor 132a recognizes the first hole sensor sensing magnet 123a being moved to the X-direction and the second hole sensor 132b recognizes the second hole sensor sensing magnet 123b being moved to the Y-direction.

In other words, the first and second hole sensors 132a and 132b may generate the motion signals according to motion of the first and second hole sensor sensing magnets 123a and 123b being moved to the X-direction or the Y-direction. The generated motion signals are converted into motion data by an operation recognition interface 600 illustrated in FIGS. 5 and 6 and the motion data is analyzed in a controller (as shown, for example, in a controller 530 in the example of FIG. 5), thereby recognizing motion of the user.

Figure 4:
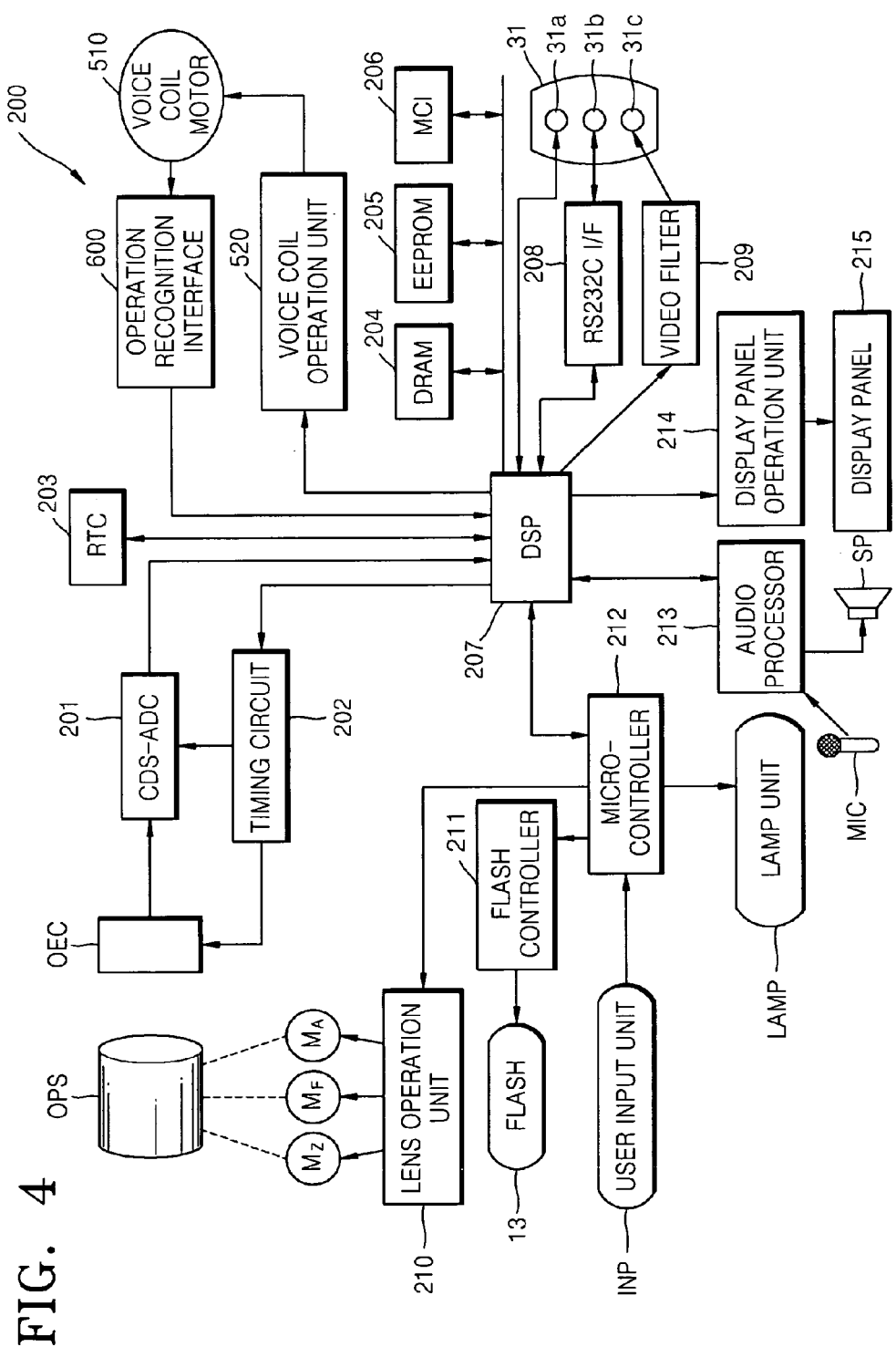
FIG. 4 is a block diagram schematically illustrating an example of a controller capable of being included in the apparatus for processing a digital image of FIG. 1.

FIG. 4 is a block diagram schematically illustrating an example of a controller 200 included in the apparatus for processing a digital image according to an embodiment of the present invention. The controller 200 included in the apparatus for processing a digital image may be installed in the digital camera 100 of FIG. 1, for example.

Referring to the example of FIG. 4, an optical system (OPS) including a lens unit and a filter unit optically processes light from the subject. The lens unit in OPS includes a zoom lens, a focus lens, and a compensation lens.

When a user presses the wide-angle zoom button W or the telephoto-zoom button T included in a user input unit INP, the responding signal is input to a micro-controller 212. Since the micro-controller 212 controls a lens operation unit 210, a zoom motor $M_z$ is operated and the zoom lens is moved.

When the wide-angle zoom button W is pressed, a focal length of the zoom lens is shortened and thus a view angle is widened so that an input image is reduced. When the telephoto-zoom button T is pressed, a focal length of the zoom lens is increased and thus a view angle is narrowed so that an input image is expanded.

Meanwhile, in an auto focusing mode, a main controller included in a digital signal processor (DSP) 207 controls the lens operation unit 210 using the micro-controller 212 and thereby a focus motor $M_F$ is operated. That is, the focus motor $M_F$ is operated and the focus lens is moved to where the most clear photo can be obtained.

The compensation lens compensates a general refractive index and thus is not operated separately. $M_A$ indicates a motor for operating an aperture (not shown).

In the filter unit of OPS, an optical low pass filter removes optical noise having high frequency components. An infrared cut filter cuts infrared components of light that is incident.

An optical to electric converter (OEC) may include an imaging device such as a charge coupled device (CCD) or a complementary metal-oxide-semiconductor (CMOS). OEC converts light from OPS into an electrically analog signal.

An analog-digital (AD) converter may include, for example, a correlation double sampler and an analog-to-digital converter (CDS-ADC) 201. The AD converter processes an analog signal from OEC to remove high-frequency noise and adjusts the amplitude and converts the signal into a digital signal. In this example, the DSP 207 controls a timing circuit 202 and thus controls operation of OEC and CDS-ADC 201.

Figure 5:
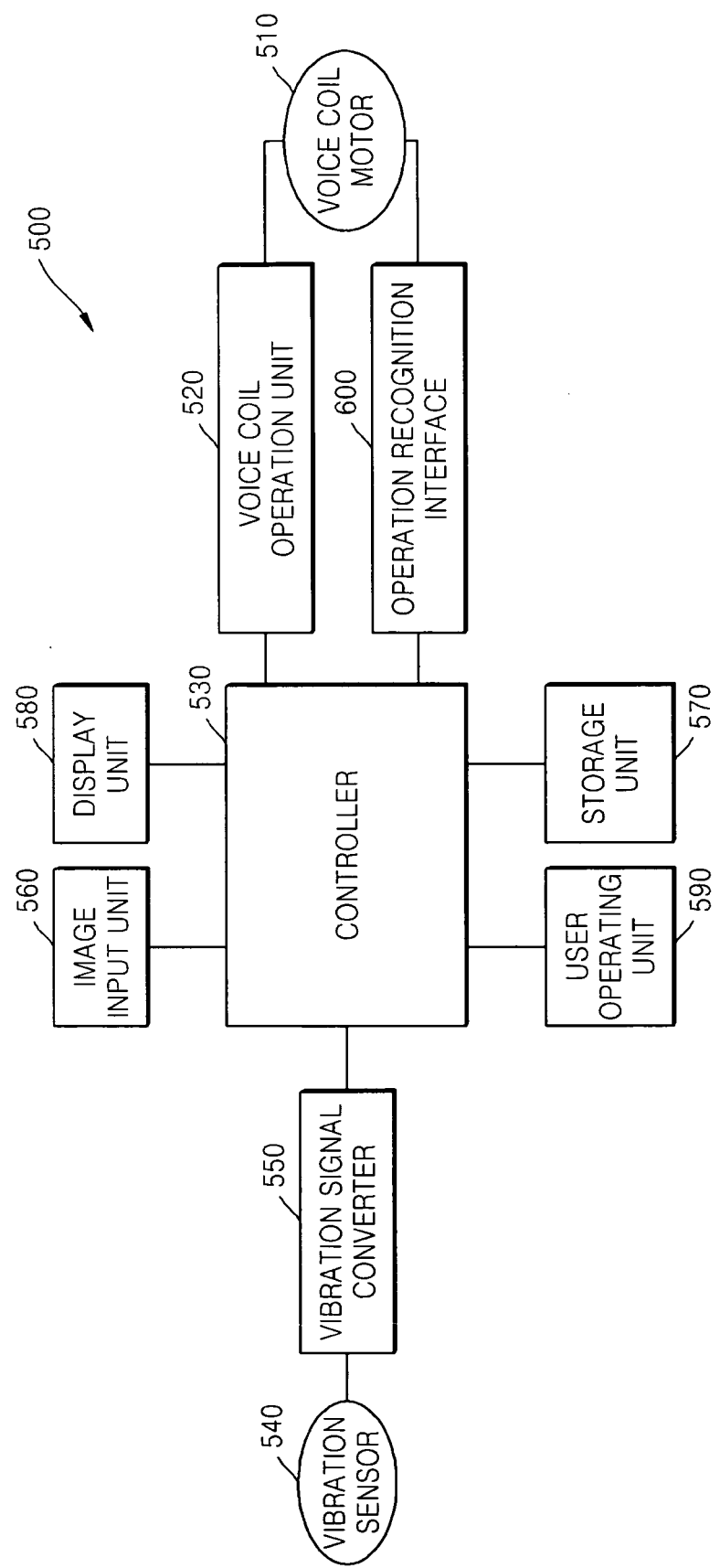
FIG. 5 is a block diagram schematically illustrating an example of an apparatus for processing a digital image according to an embodiment of the present invention.

The OPS, OEC, and CDS-ADC 201 may, for example, be included in an image input unit (as shown in the image input unit 560 in the example of FIG. 5).

A real-time clock (RTC) 203 provides time information to the DSP 207. The DSP 207 processes the digital signal from the CDS-ADC 201 and generates a digital image signal that is classified into brightness (a Y value) and a color signal (red, green, and blue (R, G, and B)).

According to control of the main controller included in the DSP 207, a lamp unit LAMP operated by the micro-controller 212 may include, for example, a self-timer lamp, an auto-focusing lamp, a mode indication lamp, and a flash standby lamp.

The DSP 207 and/or the micro-controller 212 may, for example, be included in a controller (as shown in a controller 530 in the example of FIG. 5) according to an embodiment of the present invention. In addition, user input, which is input by operation of the user operating unit (as shown in the user operating unit 590 of FIG. 5), is input to and processed in the DSP 207 and/or the micro-controller 212 through the user input unit INP and then following operations thereof may be performed.

A dynamic random access memory (DRAM) 204 temporarily stores therein the digital image signal from the DSP 207. An electrically erasable and programmable read only memory (EEPROM) 205 stores therein an algorithm and setting data such as booting program and key input program required to operate the DSP 207. A memory card interface (MCI) 206 may attach thereto and remove therefrom a user's memory card.

The memory card recognized by the DRAM 204 or the MCI 206 may store therein temporarily or in a non-volatile manner an input image input by being photographed from outside or input from a stored image file and thus, may be included in a storage unit 570 illustrated in the example of FIG. 5, In other words, the storage unit 570 may, for example, include the DRAM 204 or a cache memory, and a flash memory or the memory card which can be attached and removed in which an input image, an edited image, or motion data input by being photographed from outside or input from a stored image file are stored temporarily or in a non-volatile manner.

The digital image signal from the DSP 207 is input to a display panel operation unit 214 and thereby an image is displayed on a display panel 215. The display panel 215 is controlled by the DSP 207 and is operated by the display panel operation unit 214.

The display panel 215 and the display panel operation unit 214 may, for example, be included in a display unit (as shown in the display unit 580 in the example of FIG. 5) on which an input image input by being photographed from outside or input from a stored image file can be displayed.

Meanwhile, the digital image signal from the DSP 207 may, for example, be transmitted by a series communication through a universal serial bus (USB) connection part 31a or a RS232C interface 208 and a connection part 31b thereof and may be transmitted as a video signal through a video filter 209 and a video output unit 31c. Here, the DSP 207 may, for example, include the micro-controller 212.

An audio processor 213 outputs a voice signal from a microphone (MIC) through the DSP 207 or a speaker SP and outputs an audio signal from the DSP 207 through the speaker SP.

FIG. 5 is a block diagram schematically illustrating an example of an apparatus for processing a digital image 500 according to an embodiment of the present invention.

Referring to the example of FIG. 5, the apparatus for processing a digital image 500 may include a voice coil motor (VCM) 510, a voice coil operation unit 520, the operation recognition interface 600, the controller 530, the image input unit 560, the storage unit 570, the display unit 580, and the user operating unit 590. The apparatus for processing a digital image 500 may, for example, be controlled by a method of controlling the apparatus for processing a digital image illustrated in the example of FIG. 7.

The VCM 510 is installed to the body 100*a* of the example of FIG. 1 and senses the motion signal according to motion of the body 100*a*. The operation recognition interface 600 processes the motion signal sensed in the VCM 510 and generates motion data which is a digital signal which can be processed in the controller 530.

The image input unit 560 may receive an input image input by being photographed from outside or input from an image file. The controller 530 senses motion of the body 100*a* from motion data and recognizes user input according to the motion.

The storage unit 570 may store the image file and the motion data. The display unit 580 may display thereon a photographed input image, a stored input image, and an edited image. The user operating unit 590 may be operated by a user so as to input a desired instruction from outside.

The image input unit 560 which receives an input image may, for example, include the OPS, OEC, and CDS-ADC 201 illustrated in FIG. 4. Here, various kinds of lenses including a zoom lens may be included in OPS. The CDS-ADC 201 may be included in an imaging device which receives an image input through lenses.

The storage unit 570 may store therein an image file of an input image input by being photographed from outside or a stored image file. In the storage unit 570, DRAM (as shown in DRAM 204 of the example of FIG. 4) or a cache memory which temporarily stores data, or a flash memory or a memory card which stores data in a non-volatile manner may be included.

The user operating unit 590 may be operated by a user so as to input a desired instruction from outside. For example, the direction button 21 of FIG. 1, the menu-ok button 22 of FIG. 1, the shutter release button 26 of FIG. 1, and the power switch 28 of FIG. 1 may be included in the user operating unit 590.

The VCM 510 is installed to the body 100*a* of FIG. 1 and senses motion signals according to motion of the body 100*a*. The examples of the VCM illustrated in FIGS. 2 and 3 may be used as the VCM 510.

The operation recognition interface 600 processes the motion signals sensed in the VCM 510 and generates motion data that is a digital signal which can be processed in the controller 530. An embodiment of the operation recognition interface 600 in the apparatus for processing a digital image of FIG. 5, for example, is schematically illustrated in the circuit diagram example of FIG. 6.

Figure 6:
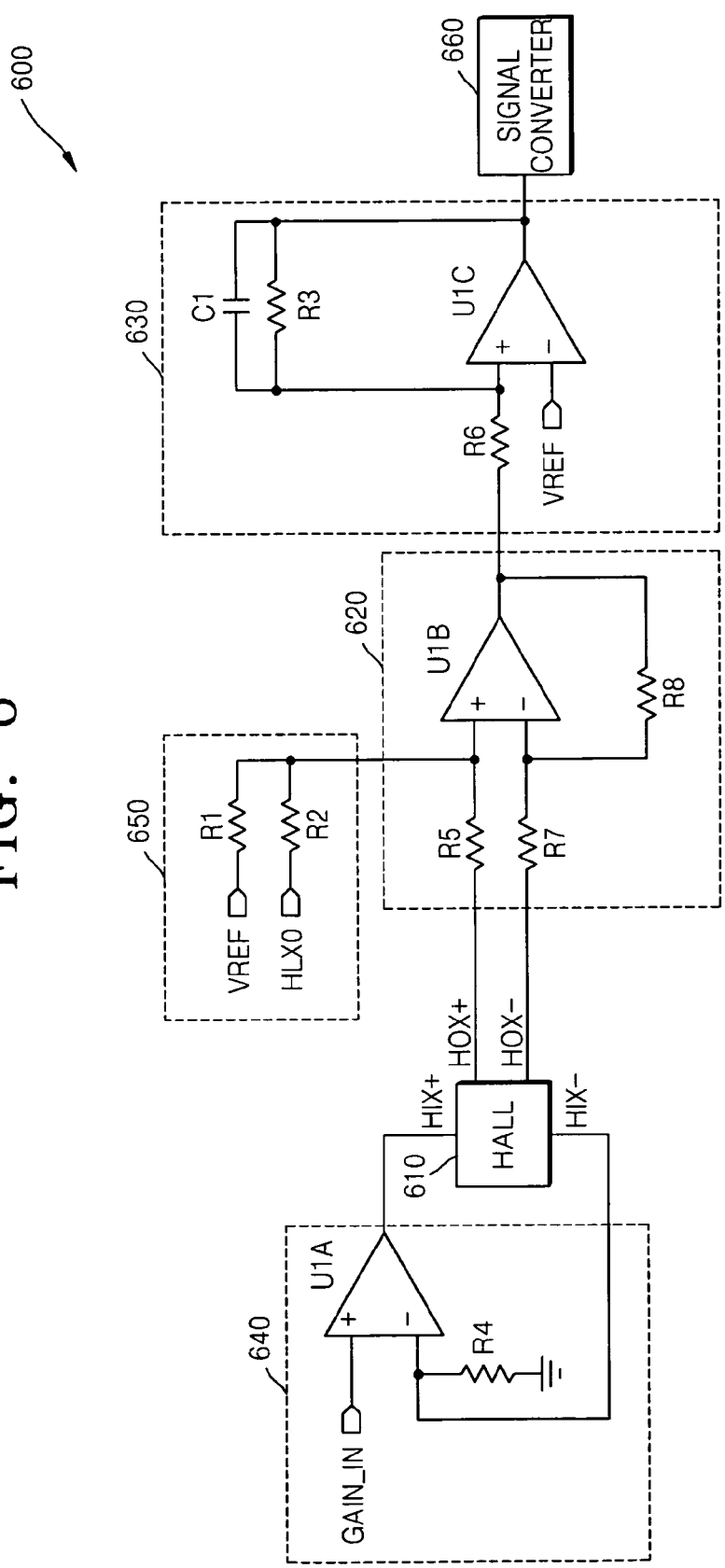
FIG. 6 is a circuit diagram schematically illustrating an example of an operation recognition interface in the apparatus for processing a digital image of FIG. 5.

A hole sensor HALL 610 in the operation recognition interface 600 of FIG. 6 may be the first and second hole sensors 132*a* and 132*b* in the VCM of FIG. 2. That is, in the VCM, the operation unit 120 elastically supported to the case 110 on the recognition unit 130 moves according to motion of the body of the apparatus for processing a digital image and thereby the first and second hole sensor sensing magnets 123*a* and 123*b* are moved.

Here, a magnetic field affecting the hole sensor HALL 610 is changed according to motion of the first and second hole sensor sensing magnets 123*a* and 123*b* and an output voltage measured in the hole sensor HALL 610 is changed.

In this case, the output voltage measured in the hole sensor HALL 610 according to motion of the first and second hole sensor sensing magnets 123*a* and 123*b* may be the motion signal. The operation recognition interface 600 converts the motion signal into motion data which is a digital signal which can be processed in the controller 530.

The controller 530 recognizes motion of the body 100*a* from the motion data and recognizes user input according to the motion. That is, the controller 530 uses output changes recognized in the VCM 510 and recognizes motion of the body 100*a*.

Here, a separate acceleration sensor (not shown) may be used, instead of the VCM 510. The acceleration sensor may include a weight body elastically supported by a four-combined spring within the case.

Here, the weight body slightly moves in a direction opposite to the case moving along the body and an electric capacitance is detected below the weight body as much as the weight body moves, thereby identifying an acceleration direction. However, when a separate acceleration sensor is used, inclusion of the acceleration sensor is required and thereby a cost thereof and a space to install the acceleration sensor are more required.

Meanwhile, in the present invention, the VCM used to move a lens is used to correct a vibrated subject and recognize the motion of the body.

Instead of user input through a button or a touch panel, the voice coil motor 510 is used to recognize motion of the user and thereby recognizes user input. Thus, functions set to correspond to user input according to each motion can be performed.

Here, the user input according to the motion can be recognized when the power is not supplied to the first and second voice coils 131*a* and 131*b* illustrated in FIG. 3 of the VCM 510 and thereby the first and second hole sensor sensing magnets 123*a* and 123*b* can freely move according to the motion of the body 100*a*.

For example, in a reproduction mode of the apparatus for processing a digital image, power is not supplied to the first and second voice coils 131*a* and 131*b* illustrated in FIG. 3 of the VCM 510 for vibration correction. In this situation, when a user moves the body 100*a* up and down or left and right or rotates the body 100*a*, the first and second hole sensors 132*a* and 132*b* illustrated in the example of FIG. 3 recognize the user input and thereby pre-set functions of skipping images forward or backward, or deleting images may be performed, for example.

FIGS. 8 through 19 schematically illustrate examples of patterns of motion signals according to motion of the operation unit 120 in VCM. In this case, patterns of motion signals 80 and 90 may vary according to motion of the motion signals 80 and 90. Here, the motion signal 80 may, for example, be measured as an output voltage Volt according to the time in the first and second hole sensors 132*a* and 132*b* illustrated in the example of FIG. 3.

The motion signals 80 and 90 may be the first motion signal 80 and the second motion signal 90. The first motion signal 80 is measured in the first hole sensor 132*a* and may be a signal measuring the body 100*a* being moved in an X-direction. The second motion signal 90 is measured in the second hole sensor 132*b* and may be a signal measuring the body 100*a* being moved in a Y-direction.

Figure 8:
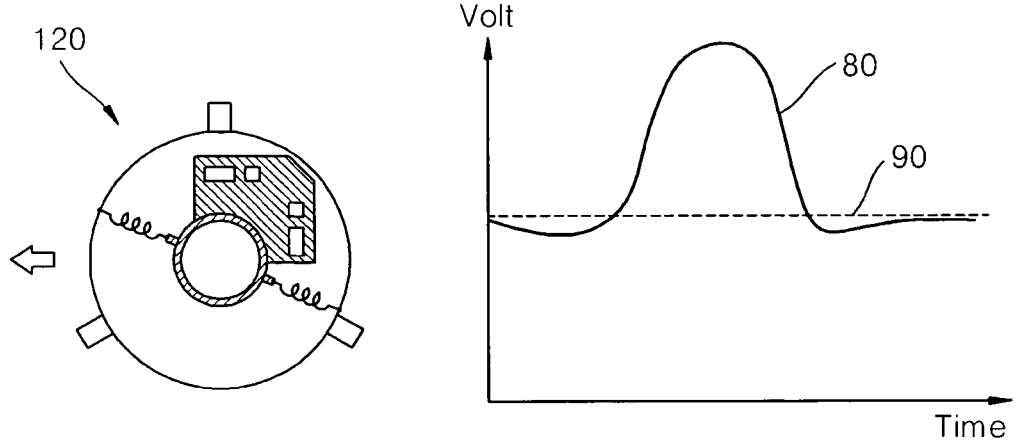
FIGS. 8 through 19 schematically illustrate examples of patterns of motion signals according to motion of an actuator in VCM.
Figure 9:
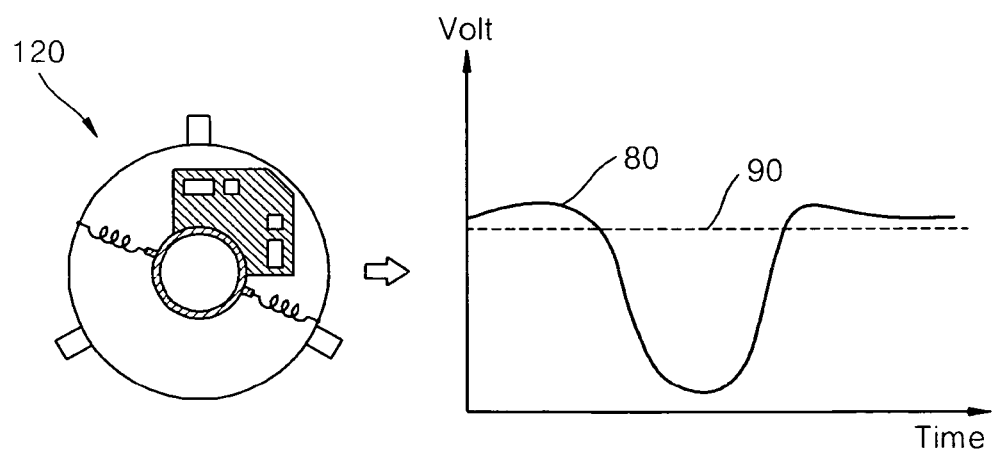

FIG. 8 shows a pattern of the output voltage of the first and second motion signals 80 and 90 in the first and second hole sensors 132*a* and 132*b* when the body 100*a* moves left. FIG. 9 shows a pattern of the output voltage of the first and second motion signals 80 and 90 in the first and second hole sensors 132*a* and 132*b* when the body 100*a* moves right.

Figure 10:
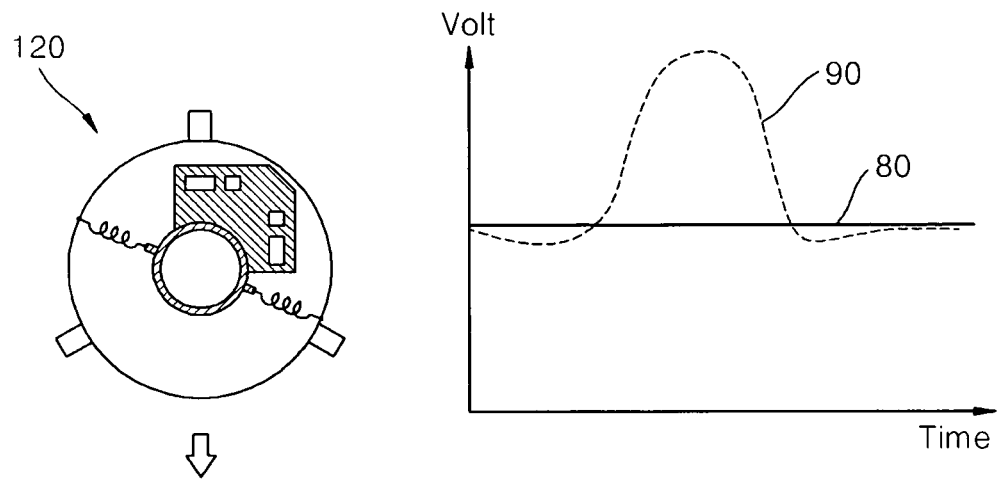
Figure 11:
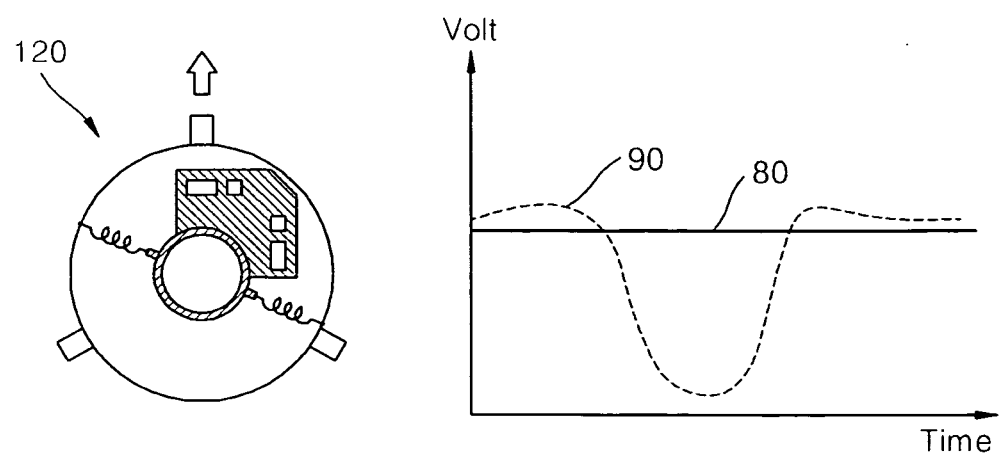

FIG. 10 shows a pattern of the output voltage of the first and second motion signals 80 and 90 in the first and second hole sensors 132*a* and 132*b* when the body 100*a* moves down. FIG. 11 shows a pattern of the output voltage of the first and second motion signals 80 and 90 in the first and second hole sensors 132a and 132b when the body 100a moves up.

Figure 12:
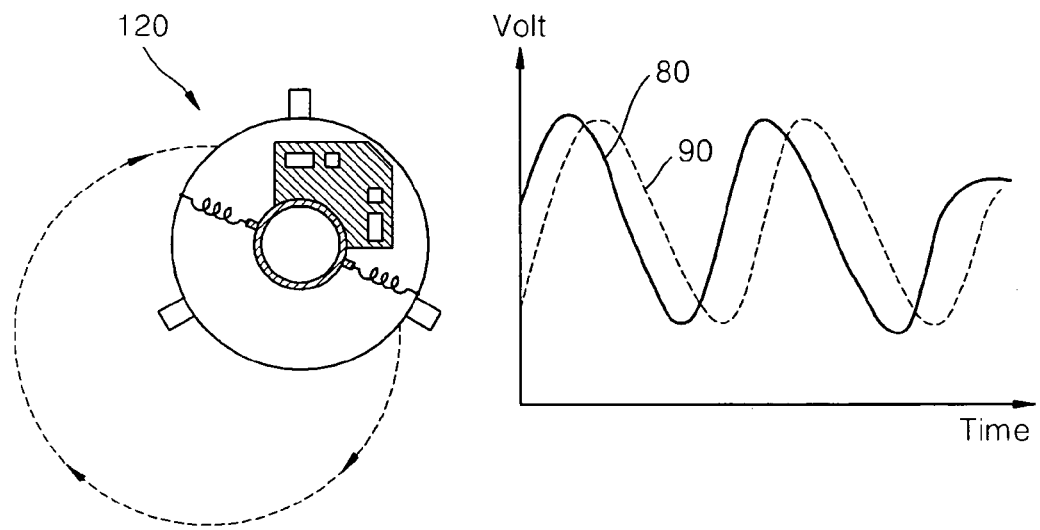
Figure 13:
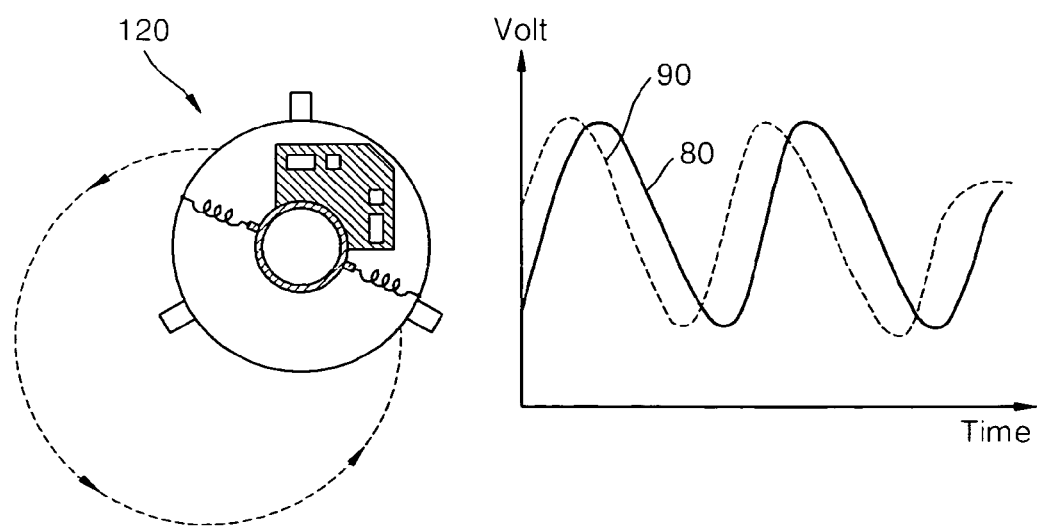

FIG. 12 shows a pattern of the output voltage of the first and second motion signals 80 and 90 in the first and second hole sensors 132a and 132b when the body 100a moves clockwise. FIG. 13 shows a pattern of the output voltage of the first and second motion signals 80 and 90 in the first and second hole sensors 132a and 132b when the body 100a moves counter-clockwise.

Figure 14:
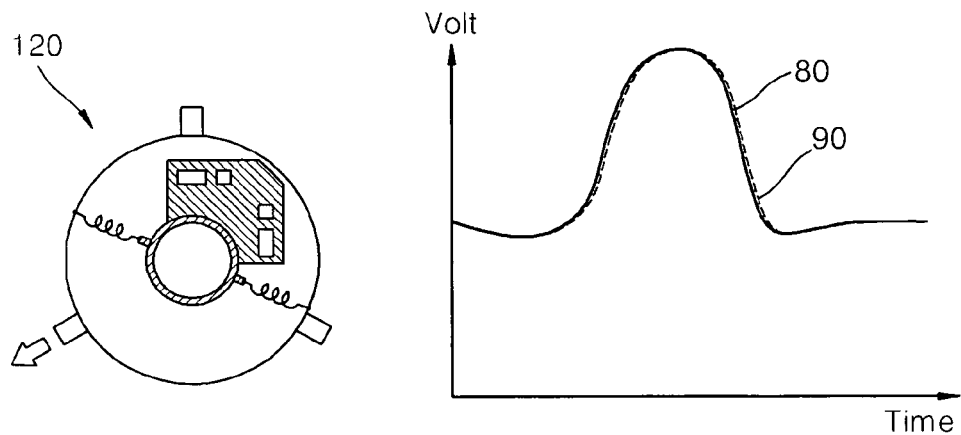
Figure 15:
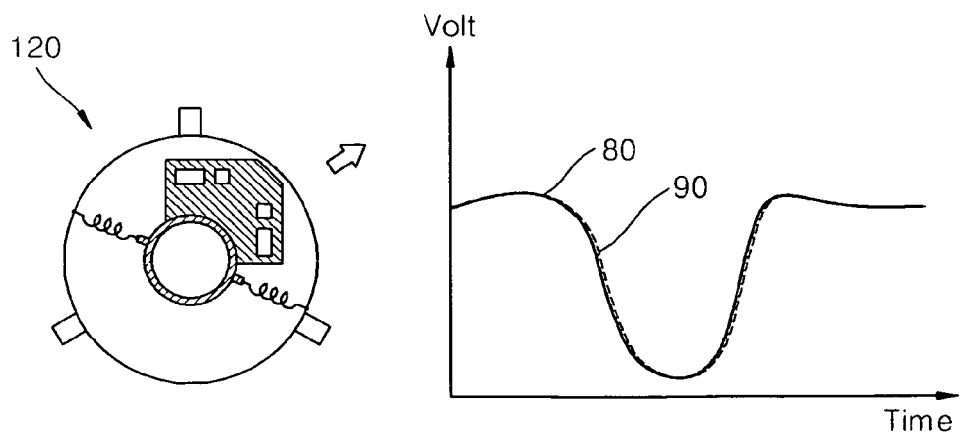

FIG. 14 shows a pattern of the output voltage of the first and second motion signals 80 and 90 in the first and second hole sensors 132a and 132b when the body 100a moves down left. FIG. 15 shows a pattern of the output voltage of the first and second motion signals 80 and 90 in the first and second hole sensors 132a and 132b when the body 100a moves up right.

Figure 16:
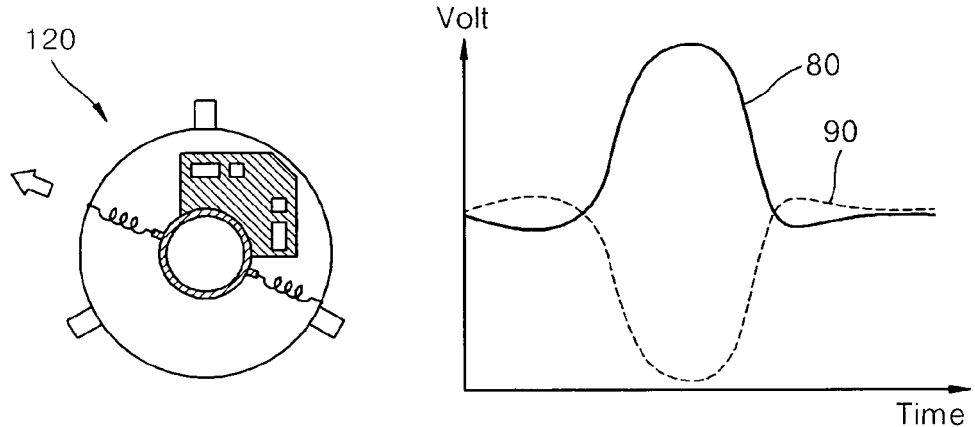
Figure 17:
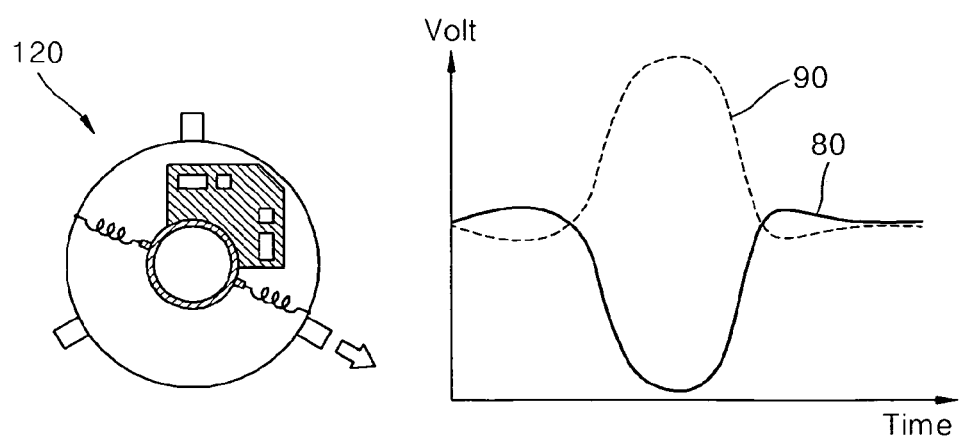

FIG. 16 shows a pattern of the output voltage of the first and second motion signals 80 and 90 in the first and second hole sensors 132a and 132b when the body 100a moves up left. FIG. 17 shows a pattern of the output voltage of the first and second motion signals 80 and 90 in the first and second hole sensors 132a and 132b when the body 100a moves down right.

Figure 18:
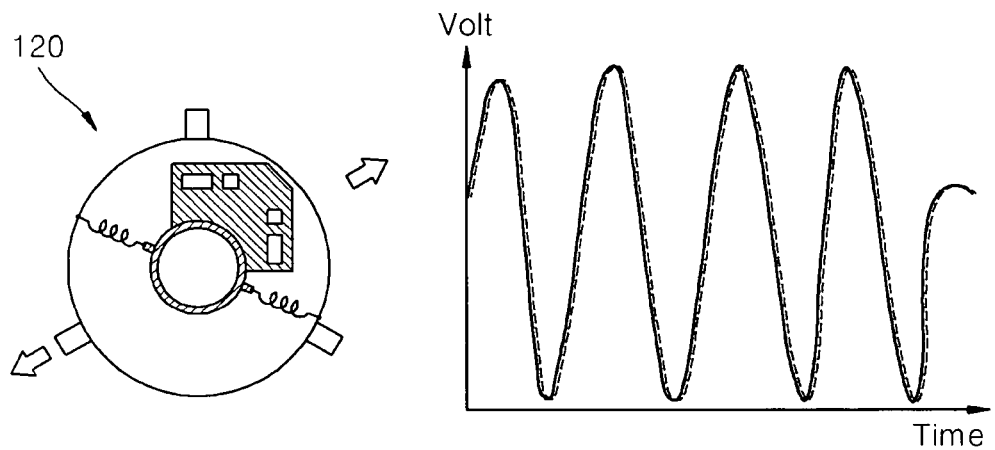
Figure 19:
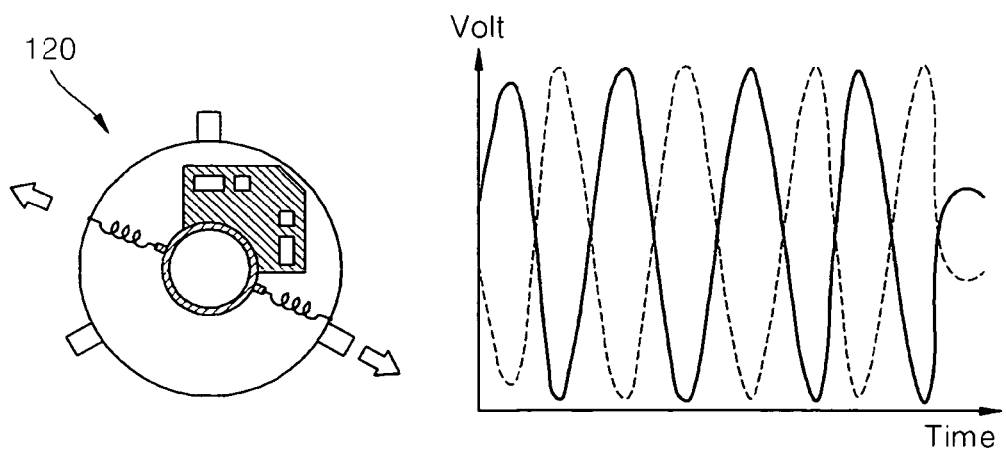

FIG. 18 shows a pattern of the output voltage of the first and second motion signals 80 and 90 in the first and second hole sensors 132a and 132b when the body 100a moves down left and up right. FIG. 19 shows a pattern of the output voltage of the first and second motion signals 80 and 90 in the first and second hole sensors 132a and 132b when the body 100a moves up left and down right.

Meanwhile, the VCM 510 senses vibration of the body 100a and thus may be used as an image stabilizer which mechanically corrects the vibration. Accordingly, the apparatus for processing a digital image 500 may further include a vibration sensor 540, a vibration signal converter 550, and the voice coil operation unit 520.

The vibration sensor 540 senses vibration of the body 100a and may generate an output signal. The vibration signal converter 550 processes the output signal generated in the vibration sensor 540 and may convert the processed output signal into a vibration signal which can be processed in the controller 530. Here, the output signal generated in the vibration sensor 540 may be an analog signal and the vibration signal may be a digital signal which can be processed in the controller 530.

The voice coil operation unit 520 receives a voice coil operation signal generated in the controller 530 and may operate voice coils included in the VCM 510. Thus, the controller 530 receives the vibration signal and may generate the voice coil operation signal operating the VCM 510 of the body 100a.

Here, the voice coil operation signal may be the signal to move the lens or the imaging device so as to compensate for the vibration of the body 100a. The voice coil operation unit may be the voice coil operation unit 520 illustrated in FIG. 4 and the operation recognition interface may be the operation recognition interface 600 illustrated in FIG. 4.

Thus, according to the present invention, motion by the user can be easily recognized without a separate acceleration sensor.

FIG. 6 is a circuit diagram schematically illustrating an example of the operation recognition interface 600 of the apparatus for processing a digital image 500 of FIG. 5.

Referring to the example of FIG. 6, the operation recognition interface 600 may include the hole sensor HALL 610, amplifiers 620 and 630, an offset controller 640, a gain controller 650, and a signal converter 660.

The hole sensor HALL 610 may be included in the VCM 510 and generate the motion signals according to the motion of the body 100a as an output voltage. The amplifiers 620 and 630 amplify the output voltage and generate amplified voltage. The signal converter 660 may convert the amplified voltage of an analog signal into motion data of a digital signal.

The gain controller 650 may control the range of amplification of the motion signals to be within the set reference range. The offset controller 640 may control offset of the motion signals.

The output voltage output in the hole sensor HALL 610 may include a first voltage and a second voltage forming a potential difference occurring due to the motion of the body 100a with respect to constant current flowing in the hole sensor HALL 610.

The amplifiers 620 and 630 may include a differential amplifier 620 and an inverting amplifier 630. The differential amplifier 620 may amplify the potential difference between the first voltage and the second voltage and generate a differential amplified voltage. The inverting amplifier 630 removes high-frequency noise from the differential amplified voltage, thereby reversing a phase and amplifying.

In the hole sensor HALL 610, a constant current input terminal HIX+, a constant current output terminal HIX−, a first output terminal HOX+, and a second output terminal HOX− may be included.

The constant current input terminal HIX+ is the terminal where constant current is input thereto. The constant current output terminal HIX− outputs constant current. The first output terminal HOX+ outputs the first voltage. The second output terminal HOX− outputs the second voltage.

When constant current flows through the hole sensor HALL 610 from the constant current input terminal HIX+ to the constant current output terminal HIX−, small+voltage of the first voltage and small−voltage of the second voltage are respectively output from the first output terminal HOX+ and the second output terminal HOX−. The magnitude of the output voltage is proportional to the input constant current. However, when the output voltage exceeds a predetermined amount, the output voltage may be saturated.

The offset controller 640 includes a comparator U1A. When a predetermined voltage is applied to an input terminal GAIN_IN of the comparator U1A, a voltage is applied to a resistance R4 used to drop voltage. Such voltage is substantially the same with predetermined voltage applied to the input terminal GAIN_IN. Thus, according to the constant voltage supplied to the input terminal GAIN_IN, offset of the output voltage is controlled.

Here, the range of the amplitude of the motion signals is controlled by the predetermined voltage applied to the input terminal GAIN_IN to be within the set reference range. Current flowing in the hole sensor HALL 610 may be the value obtained by dividing the predetermined voltage applied to the input terminal GAIN_IN by the resistance R4 used to drop voltage.

The first and second voltages which are the output voltage of the hole sensor HALL 610 may be respectively positive and negative voltages that are mutually symmetrical to each other. The first and second voltages may form voltages of mV in a + or − direction at a predetermined reference voltage. Here, when power source voltage is 3.3 V, the reference voltage may be 1.65 V which is a half of the power source voltage.

The differential amplifier 620 may be used to amplify the first voltage and the second voltage and may include an amplifier U1B. The difference between the first voltage and the second voltage may be amplified by the differential amplifier 620 by a set amplified ratio and may have a phase opposite to the output voltage of the hole sensor HALL 610.

Here, the amplified ratio may be determined by ratio of resistances R5, R7, R1, R2, and R8 combined to the differential amplifiers. That is, the amplitude of the amplified waveforms may vary according to ratio of the resistances R5, R7, R1, R2, and R8 combined to the differential amplifiers. As the reference voltage VREF for controlling bias in the gain controller 650, the half of the power source voltage may be applied. In other words, when the power source voltage of 3.3 V is used, waveforms are formed in a + or − direction based on the half of the reference voltage VREF of 1.65 V. In order to slightly control bias, voltage is applied to an input terminal HLX0 of the gain controller 650 connected to the + input terminal of the differential amplifier 620 and thus whole bias moves.

A bias controlled voltage supplied to the input terminal HLX0 of the gain controller 650 may be controlled for the center axis thereof to be in the location that is half of the power source voltage for voltage balance.

The waveform amplified in the differential amplifier 620 is inversed to the first voltage output from the hole sensor HALL 610 so that the waveform may be amplified once more by the inverting amplifier 630 to be the same. The inverting amplifier 630 may include an amplifier U1C and a coupling condenser C1. The inverting amplifier 630 may amplify the waveform by the ratio of −R3/R6 of the resistances R3 and R6 connected to the amplifier U1C.

The coupling condenser C1 removes high-frequency noise included in the waveform. The signal that is finally amplified in the inverting amplifier 630 may be converted into a digital signal in the signal converter 660. Here, the signal converter 660 may be an analog to digital converter (ADC) in a microprocessor.

Figure 7:
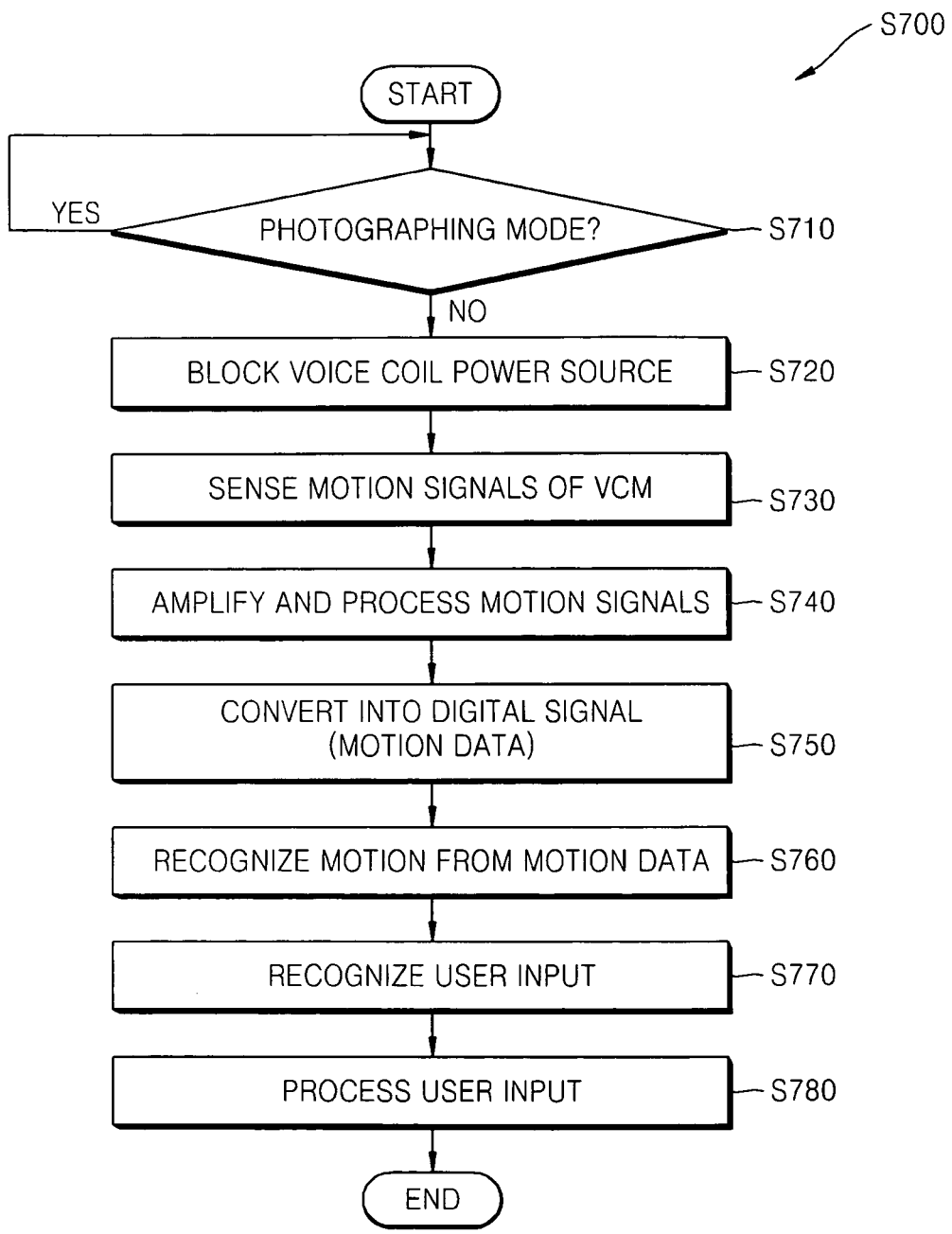
FIG. 7 is a flowchart schematically illustrating an example of a method of controlling an apparatus for processing a digital image according to an embodiment of the present invention.

FIG. 7 is a flowchart schematically illustrating an example of a method S700 of controlling an apparatus for processing a digital image according to an embodiment of the present invention.

The method S700 of controlling an apparatus for processing a digital image may be realized in the apparatus for processing a digital image of FIG. 1 and/or the apparatus for processing a digital image 500 of FIG. 5. Accordingly, the method S700 of controlling an apparatus for processing a digital image may be stored in a storage means of FIG. 5 or may be a program or an algorithm realized in a semiconductor chip such as Firmware.

The method S700 of controlling an apparatus for processing a digital image may be executed in the apparatus for processing a digital image 500 of FIG. 5. Thus, subject matters that are same with the description of the apparatus for processing a digital image 500 are referred to the detailed description of the apparatus for processing a digital image 500 of FIG. 5.

The method S700 of controlling an apparatus for processing a digital image may include: blocking a voice coil power source in operation 720; sensing motion signals in operation 730; recognizing motion in operations 740 through 760; and recognizing user input in operation 770.

In blocking a voice coil power source in operation 720, the power supplied to the voice coils included in the VCM installed to the body is blocked. In sensing motion signals in operation 730, the motion signals generated in the VCM by the motion of the body are sensed.

In recognizing motion in operations 740 through 760, motions by the motion of the body are recognized from the motion signals. In recognizing user input in operation 770, the user input is recognized from the motions.

The VCM may be an actuator which mechanically compensates the vibration of the body recognized through the vibration sensor in an image stabilizer. Thus, in the present invention, user motions may be easily received without inclusion of separate acceleration sensor.

The method S700 of controlling an apparatus for processing a digital image may further include determining a photographing mode in operation 710. In determining a photographing mode in operation 710, the apparatus for processing a digital image determines whether a current operating mode is a photographing mode for photographing an image. That is, when it is not determined as a photographing mode, it is recognized that the power is not required to be supplied to the voice coils of the VCM for vibration correction and thus blocking a voice coil power source in operation 720 is performed.

For example, when the power is not required to be supplied to the voice coils of the VCM for vibration correction as in a reproduction mode, the power of the voice coils is blocked and user motions can be received through the VCM.

The recognizing motion in operations 740 through 760 may include: processing motion signals in operation 740; converting the motion signals in operation 750; and recognizing the motions in operation 760.

In processing motion signals in operation 740, signal processing such as amplification and high-frequency noise removal is performed to the motion signals. In converting the motion signals in operation 750, an analog motion signal is converted into a digital motion data. In recognizing the motions in operation 760, the user motions are recognized from motion data.

In recognizing user input in operation 770, motion patterns of motion data are recognized and user input corresponding to the each of the motion patterns can be recognized. Moreover, the method S700 of controlling an apparatus for processing a digital image may further include performing an operation according to the user input in operation 780.

Here, the user input may be recognized according to the patterns of the motion signals output from the VCM based on the motion of the body as illustrated in the examples of FIGS. 8 through 19.

According to the present invention, user motions can be easily recognized without a separate acceleration sensor.

According to the apparatus for processing a digital image and the method of controlling the apparatus in the present invention, user input by user motions can be recognized through the VCM so that user input by the user motions can be recognized at a low cost.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for processing a digital image comprising:
   a body;
   a voice coil motor (VCM) installed to the body that is configured to generate motion signals according to motion of the body;
   an operation recognition interface configured to process the motion signals and to generate motion data of a digital signal; and
   a controller configured to recognize motion of the body from the motion data and to recognize user input according to the motion, wherein user input is recognized while the apparatus is in a reproduction mode, wherein motion patterns of the motion data are recognized, each of the motion patterns has pre-set functionality and the pre-set functionality is performed, while the apparatus is in a reproduction mode, according to the recognized motion pattern.

2. The apparatus of claim 1, wherein the VCM comprises a hole sensor generating the motion signals as an output voltage according to the motion of the body.

3. The apparatus of claim 2, wherein the operation recognition interface comprises an amplifier and a signal converter, the amplifier amplifying the output voltage and generating an amplified voltage and the signal converter converting the amplified voltage of an analog signal into the motion data of a digital signal.

4. The apparatus of claim 3, wherein the operation recognition interface further comprises a gain controller and an offset controller, the gain controller controlling the range of amplification of the motion signals to be within a set reference range and the offset controller controlling offset of the motion signals.

5. The apparatus of claim 3, wherein the output voltage comprises a first voltage and a second voltage forming a potential difference according to the motion of the body with respect to constant current flowing in the hole sensor.

6. The apparatus of claim 5, wherein the amplifier comprises a differential amplifier and an inverting amplifier, the differential amplifier amplifying the difference between the first voltage and the second voltage and generating the differential amplified voltage and the inverting amplifier removing high-frequency noise from the differential amplified voltage and reversing a phase, thereby amplifying.

7. The apparatus of claim 1, wherein the VCM comprises an operation unit and a recognition unit, the operation unit moving in a direction opposite to the motion of the body with respect to the body and the recognition unit installed to be fixed to the body recognizing the motion of the operation unit.

8. The apparatus of claim 7, wherein the operation unit comprises:
a lens holder included in a case, fixing a lens group including at least one lens to a center portion of the operation unit, and being accelerated in a direction opposite to the motion of the body;
an operating magnet operating the lens holder, which is fixed to the lens holder;
a hole sensor sensing magnet sensing the motion of the lens holder, which is fixed to the lens holder; and
an elastic body allowing the lens holder to be elastically supported to the case.

9. The apparatus of claim 8, wherein the recognition unit comprises a voice coil and the hole sensor, the voice coil installed to correspond to the operating magnet operating the operating magnet and the hole sensor recognizing the motion of the hole sensor sensing magnet.

10. The apparatus of claim 7, wherein the VCM further comprises at least one bearing disposed between the operation unit and the recognition unit guiding the operation unit to two-dimensionally move with respect to the recognition unit.

11. The apparatus of claim 9, wherein the motion signals are generated when the power is not supplied to the voice coil.

12. The apparatus of claim 1, further comprising:
a vibration sensor sensing vibration of the body; and
a vibration signal converter processing an output signal of the vibration sensor and converting the processed output signal into a vibration signal which can be processed in the controller.

13. The apparatus of claim 12, wherein the controller receives the vibration signal and generates a voice coil operation signal operating the VCM which moves the lens for compensating the vibration of the body.

14. The apparatus of claim 13, further comprising a voice coil operation unit receiving the voice coil operation signal and operating the voice coil included in the VCM.

15. The apparatus of claim 1, wherein the motion of the body on a plane is sensed and the motions are recognized.

16. A method of controlling an apparatus for processing a digital image, the method comprising:
while the apparatus is in a reproduction mode:
(a) blocking a power supplied to a voice coil included in a voice coil motor (VCM) installed to a body;
(b) sensing motion signals generated by the motion of the body in the VCM while the power supply is blocked;
(c) recognizing motion by the motion of the body from the motion signals; and
(d) recognizing user input from the motion;
(e) recognizing motion patterns of the motion data, wherein each of the motion patterns has pre-set functionality; and
(f) performing the pre-set functionality according to the recognized motion pattern.

17. The method of claim 16, wherein (c) comprises generating motion data of a digital signal by processing the motion signals and recognizing the motion from the motion data.

* * * * *